(12) United States Patent
Mondello et al.

(10) Patent No.: US 11,049,402 B2
(45) Date of Patent: Jun. 29, 2021

(54) CRYPTOGRAPHY-BASED PLATOONING MECHANISM FOR AUTONOMOUS VEHICLE FLEET MANAGEMENT

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 137 days.

(21) Appl. No.: 16/363,271

(22) Filed: Mar. 25, 2019

(65) Prior Publication Data
US 2020/0312154 A1 Oct. 1, 2020

(51) Int. Cl.
*G08G 1/00* (2006.01)
*H04W 4/46* (2018.01)
(Continued)

(52) U.S. Cl.
CPC ............ *G08G 1/22* (2013.01); *G05D 1/0022* (2013.01); *G05D 1/0293* (2013.01);
(Continued)

(58) Field of Classification Search
CPC ......... G08G 1/22; H04W 4/46; G05D 1/0022; G05D 1/0293; H04L 9/0637; H04L 9/3236; H04L 2209/38
See application file for complete search history.

(56) References Cited

U.S. PATENT DOCUMENTS 6,356,820 B1 * 3/2002 Hashimoto .............. G08G 1/22
180/167
2010/0268445 A1 10/2010 Chen et al.
(Continued)

FOREIGN PATENT DOCUMENTS

WO 2018035145 2/2018

OTHER PUBLICATIONS

"William G. Wong, TCG Rolls DICE for Automotive Security | Electronic Design, Aug. 18, 2017" (Year: 2017).*
(Continued)

*Primary Examiner* — Anne Marie Antonucci
*Assistant Examiner* — Sahar Motazedi
(74) *Attorney, Agent, or Firm* — Greenberg Traurig

(57) ABSTRACT

Disclosed are techniques for managing a platoon of autonomous vehicles. In one embodiment, a method is disclosed comprising establishing a network connection between a plurality of autonomous vehicles, the plurality of autonomous vehicles operating as a platoon; receiving a request from a first autonomous vehicle to deviate from the platoon, the request comprising a digitally signed message from the first autonomous vehicle; assigning the first autonomous vehicle as a second master autonomous vehicle; permanently recording the assignment in a blockchain data structure; instantiating a new platoon path using the first autonomous vehicle as a head of the new platoon path; and disconnecting one or more autonomous vehicles associated with the new platoon path upon determining that the new platoon path is stable, the disconnecting causing the second master autonomous vehicle to manage the one or more autonomous vehicles using a second blockchain stored on the second master autonomous vehicle.

20 Claims, 8 Drawing Sheets

(51) Int. Cl.
    *G05D 1/00*          (2006.01)
    *H04L 9/06*          (2006.01)
    *H04L 9/32*          (2006.01)
    *G05D 1/02*          (2020.01)

(52) U.S. Cl.
    CPC .......... *H04L 9/0637* (2013.01); *H04L 9/3236* (2013.01); *H04W 4/46* (2018.02); *H04L 2209/38* (2013.01)

(56)               References Cited

U.S. PATENT DOCUMENTS

| | | | |
|---|---|---|---|
| 2016/0285864 A1* | 9/2016 | Canavor | H04W 12/0602 |
| 2018/0188746 A1* | 7/2018 | Lesher | G08G 1/20 |
| 2018/0253976 A1 | 9/2018 | Inam et al. | |
| 2019/0025818 A1* | 1/2019 | Mattingly | G05D 1/0027 |
| 2020/0064140 A1* | 2/2020 | Tarkiainen | G08G 1/0116 |

OTHER PUBLICATIONS

Hexmoor, Henry et al. "BlockChain for Improved Platoon Security." International Journal of Information Systems and Computer Sciences, vol. 7, No. 2. Retrieved from the Internet: <http://paper.researchbib.com/view/paper/162871>. Mar.-Apr. 2018.
International Search Report and Written Opinion, PCT/US2020/021112, dated Sep. 25, 2020.

\* cited by examiner

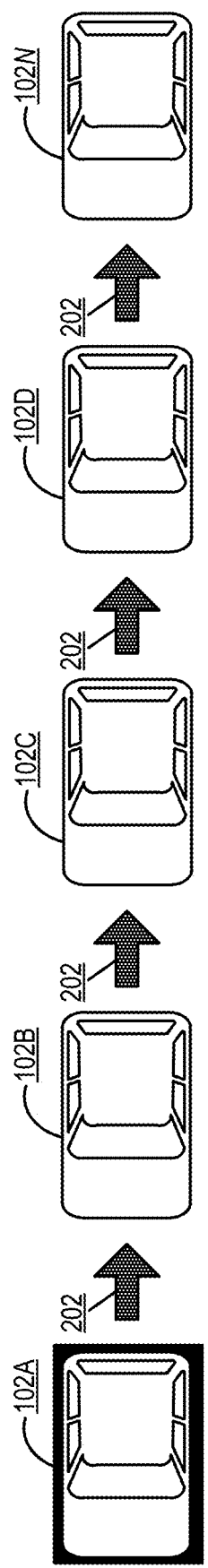

CRYPTOGRAPHY-BASED PLATOONING MECHANISM FOR AUTONOMOUS VEHICLE FLEET MANAGEMENT

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward autonomous vehicles and, specifically, to systems and methods for managing a fleet of autonomous vehicles.

With the advent of autonomous vehicles, various new technical problems and solutions thereto have arisen. Since autonomous vehicles are controlled programmatically, one of these new solutions is the concept of "platooning" autonomous vehicles. During platooning, autonomous vehicles are closely positioned to other autonomous vehicles while in motion. Generally, all movements of the autonomous vehicles are synchronized with one another to maintain this close formation throughout a route.

Platooning overs numerous advantages over human-driven vehicles. Overall, platooning increases the capacity of a roadway. When driven by humans, vehicles are suggested (or required) to maintain a safe following distance (e.g., three car-lengths). This distance is required solely to compensate for the delay in human reactions to sudden stops or other hazards. Thus, a majority of a roadway is "unused," that is, used primarily for buffering vehicles. Platooning removes this buffer space and allows for the entire road to be used by platooning vehicles close to one another.

Additionally, platooning reduces fuel consumption and increases fuel efficiency of the platoon due to decreased air resistance and reduces the likelihood of accidents due to, for example, the elimination of vehicles overtaking one another.

Currently, one class of solutions for implementing platooning generally relies upon a centralized server and the use of GPS measurements. For example, a central station may receive the position of a vehicle and calculate the positions of other vehicles in the platoon. These calculated positions are then transmitted to control the position of each vehicle based on the first vehicle. This class of solutions however suffers from significant delays in transmitting data from autonomous vehicles to a network operation center (NOC), which could negatively and, in some cases, fatally, impact the platoon.

Another class of solutions utilizes vehicle-to-vehicle (V2V) communications links to coordinate the platoon. In general, these solutions rely upon a protocol based, at least in part, on a dedicated short-range communication (DSRC) protocol. While the use of DSRC-based protocols removes the strong reliance on a NOC, the protocol is (by default) insecure and capable of being manipulated. Further, the protocol itself is ephemeral and provides no storage of data that can be shared among a platoon.

Thus, there exists a need in the current state of the art for a secure, decentralized system and method for managing a platoon of vehicles.

SUMMARY

Disclosed herein are methods, computer-readable media, and devices for managing a platoon of autonomous vehicles using cryptography and a blockchain data storage layer.

In one embodiment, a method is disclosed comprising establishing a network connection between a plurality of autonomous vehicles, the plurality of autonomous vehicles operating as a platoon; receiving a request from a first autonomous vehicle to deviate from the platoon, the request comprising a digitally signed message from the first autonomous vehicle; assigning the first autonomous vehicle as a second master autonomous vehicle; permanently recording the assignment in a blockchain data structure; instantiating a new platoon path using the first autonomous vehicle as a head of the new platoon path; and disconnecting one or more autonomous vehicles associated with the new platoon path upon determining that the new platoon path is stable, the disconnecting causing the second master autonomous vehicle to manage the one or more autonomous vehicles using a second blockchain stored on the second master autonomous vehicle.

In another embodiment, a device is disclosed comprising a processor; and a storage medium for tangibly storing thereon program logic for execution by the processor, the stored program logic comprising: logic, executed by the processor, for establishing a network connection between a plurality of autonomous vehicles, the plurality of autonomous vehicles operating as a platoon; logic, executed by the processor, for receiving a request from a first autonomous vehicle to deviate from the platoon, the request comprising a digitally signed message from the first autonomous vehicle; logic, executed by the processor, for assigning the first autonomous vehicle as a second master autonomous vehicle; logic, executed by the processor, for permanently recording the assignment in a blockchain data structure; logic, executed by the processor, for instantiating a new platoon path using the first autonomous vehicle as a head of the new platoon path; and logic, executed by the processor, for disconnecting one or more autonomous vehicles associated with the new platoon path upon determining that the new platoon path is stable, the disconnecting causing the second master autonomous vehicle to manage the one or more autonomous vehicles using a second blockchain stored on the second master autonomous vehicle.

In another embodiment, a non-transitory computer readable storage medium for tangibly storing computer program instructions capable of being executed by a computer processor is disclosed, the computer program instructions defining the steps of establishing a network connection between a plurality of autonomous vehicles, the plurality of autonomous vehicles operating as a platoon; receiving a request from a first autonomous vehicle to deviate from the platoon, the request comprising a digitally signed message from the first autonomous vehicle; assigning the first autonomous vehicle as a second master autonomous vehicle; permanently recording the assignment in a blockchain data structure; instantiating a new platoon path using the first autonomous vehicle as a head of the new platoon path; and disconnecting one or more autonomous vehicles associated with the new platoon path upon determining that the new platoon path is stable, the disconnecting causing the second master autonomous vehicle to manage the one or more autonomous vehicles using a second blockchain stored on the second master autonomous vehicle.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

FIGS. 2A through 2C illustrate an autonomous vehicle platoon change according to some embodiments of the disclosure.

DETAILED DESCRIPTION

Figure 1:
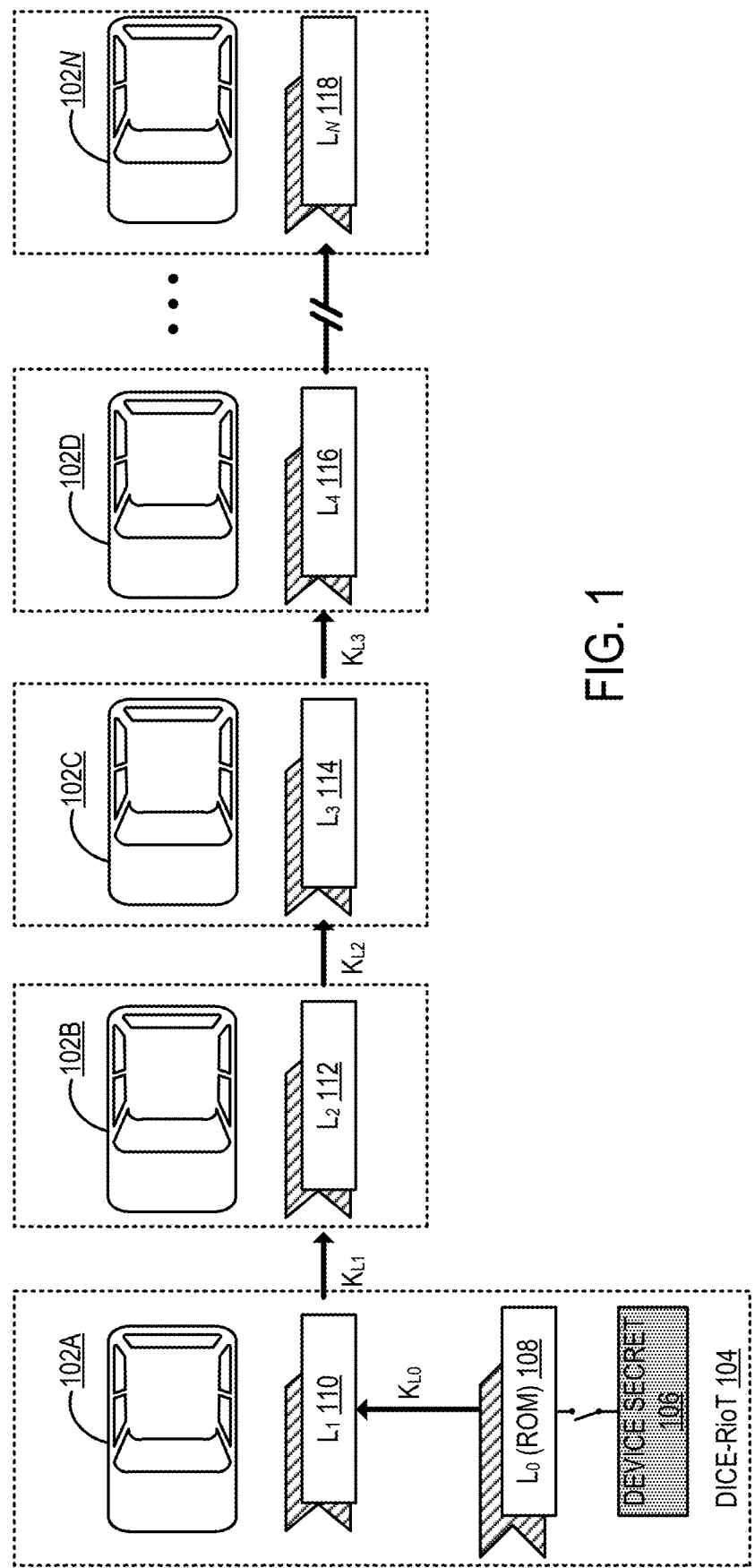
FIG. 1 is a diagram illustrating an autonomous vehicle platoon according to some embodiments of the disclosure.

FIG. 1 is a diagram illustrating an autonomous vehicle platoon according to some embodiments of the disclosure.

Figure 4:
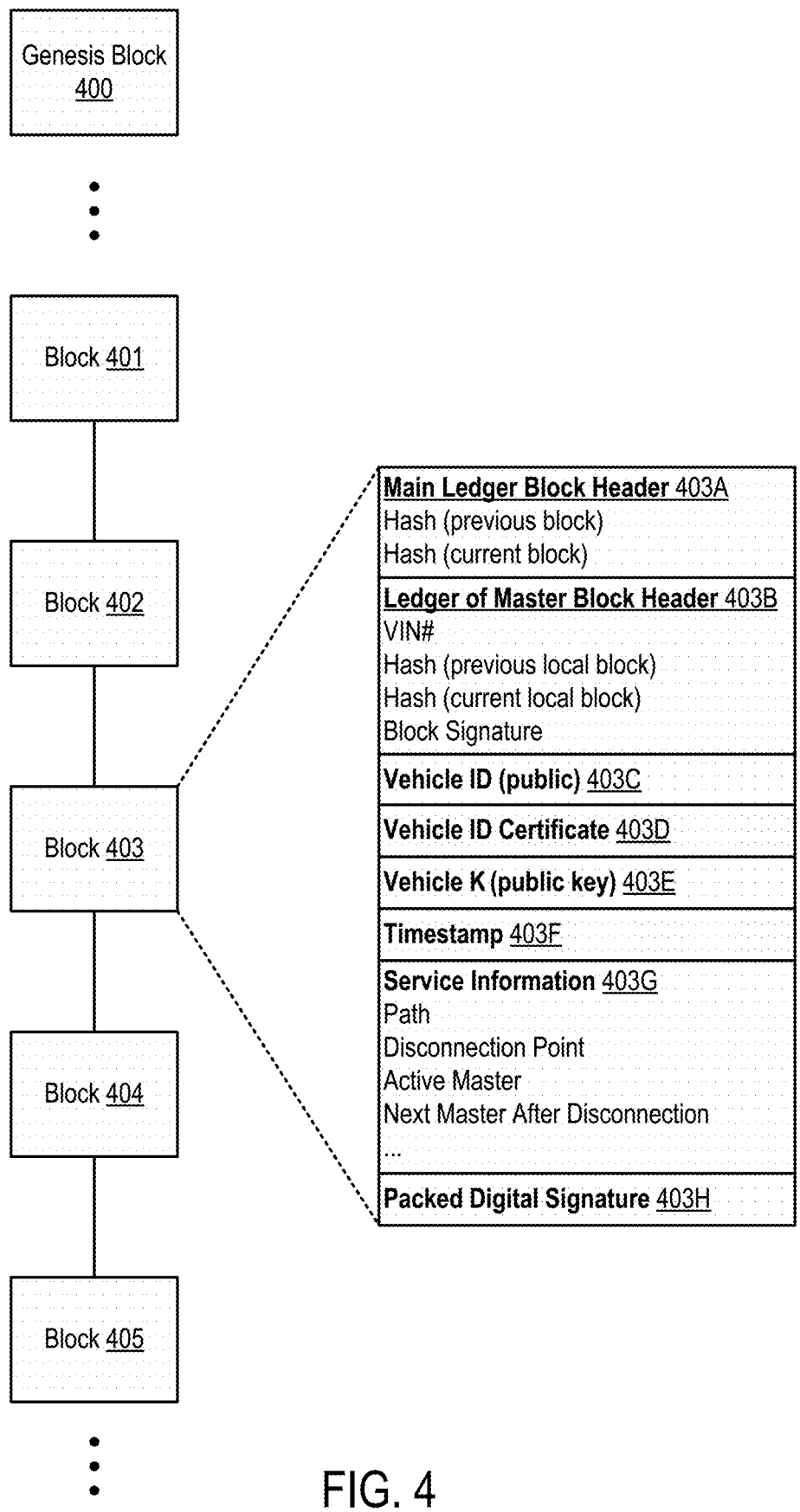
FIG. 4 is a diagram of an autonomous vehicle blockchain and block layout according to some embodiments of the disclosure.

Autonomous vehicles (102a-102n) are illustrated in FIG. 1. Each of the autonomous vehicles (102a-102n) are equipped with cryptographic subsystems and messaging subsystems, as illustrated in FIG. 4. The autonomous vehicles (102a-102n) are configured to establish a vehicle ad-hoc network (VANET) between each of the autonomous vehicles (102a-102n). In one embodiment, the VANET may be created using dedicated short-range communications (DSRC) or 5GLTE communications channels. Alternatively, or in conjunction with the foregoing, the autonomous vehicles (102a-102n) may be connected to a centralized network via a cellular, satellite, mesh network, or other network connection. In general, the disclosed embodiments are not intended to be limited to the specific type of network employed so long as each of the autonomous vehicles (102a-102n) can transmit messages to one or more autonomous vehicles (102a-102n). Although the following description provides examples of autonomous automobiles, other types of vehicles should be considered to fall within the scope of the disclosure such as ships, air planes, drones, etc.

For the autonomous vehicles (102a-102n) to communicate with one another, a mechanism for ensuring the authenticity of messages is required. If such a mechanism were not employed, the autonomous vehicles (102a-102n) would be subject to malicious or erroneous messages causing them to deviate from a platoon. For instance, an attacker could spoof messages diverting some or all the autonomous vehicles (102a-102n) to a location chosen by the attacker. Further, in a platooning setup, a single vehicle controls the platoon (i.e., the lead vehicle) and thus an entire platoon of vehicles is subject to a single point of failure. Thus, the integrity of communications between vehicles if paramount.

Each autonomous vehicle (102a-102n) is equipped with a cryptographic subsystem. As illustrated in FIG. 1, each autonomous vehicle (102a-102n) is equipped with a device identifier composite engine (DICE) and robust Internet of Things (RIoT) (collectively, "DICE-RIoT") subsystem. Only one such subsystem (104) is illustrated, but each autonomous vehicle (102a-102n) may be equipped with a such a subsystem. In other embodiments, various other types of systems may be used such as a trusted platform module (TPM) system. However, a DICE-RIoT system may be utilized due to the lower hardware requirements of the system.

A brief overview of the DICE-RIoT architecture is provided herein. Each DICE-RIoT subsystem (104) includes a device secret (106). DICE functionality in the DICE-RIoT subsystem (104) creates a secret value called the Compound Device Identity (CDI) and passes it to an $L_0$ (Layer 0) RIoT Core (108) in read-only memory (ROM). The CDI is typically a 32-byte value produced using a SHA256 hashing function based on a per-device secret and the hash of RIoT Core (108). Alternative implementation may utilize other cryptographic one-way functions and produce other values of different lengths. RIoT Core (108) uses the CDI to derive additional keys and secrets and then deletes the CDI from RAM and registers. In some embodiments, the RIoT Core (108) never changes, so the CDI remains the same for the life of the device. In another embodiment, the RIoT Core (108) may be securely updated, resulting in a new, unique CDI.

RIoT Core (108) additionally creates an asymmetric DeviceID key pair using a deterministic key generation function seeded with the CDI. Additionally, the RIoT Core (108) generates a cryptographic device identifier and a certificate. The device identifier, certificate, and public DeviceID key are exported to Layer 1 ($L_1$) software (110) executing in, for example, the operating system (OS) of the autonomous vehicle (102a). Additionally, the RIoT Core (108) creates a certificate containing the DeviceID public key. The certificate allows other devices to confirm that the DeviceID public key is associated with the $L_0$ and $L_1$ layers of the RIoT Core (108). In one embodiment, RIoT Core (108) signs the certificate using the DeviceID private key. In another embodiment, RIoT Core (108) creates a certificate signing request ("CSR") structure (e.g. a PKCS10 request) for the DeviceID public key, signed by the DeviceID private key.

In the illustrated embodiment, RIoT Core (108) exports the DeviceID public key, certificate, and a vehicle identifier to the $L_1$ software (110). As described herein, the $L_0$ and $L_1$ layers refer to software or firmware executing on lead vehicle (102a) while $L_2$ refers to a layer on the second vehicle (102b), $L_3$ refers to a layer on third vehicle (102c), etc. This triple is generally represented as $\{ID_{Lk}$ public, $ID_{Lk}$ certificate, $K_{Lk}$ public$\}$. In the illustrated embodiment, $L_1$ software (110) can comprise system-level or user-level code. No limitation is placed on the specific nature of the code. However, as will be described, one major functionality of the $L_1$ software (110) is to coordinate platooning information of a platoon. In the illustrated embodiment, $L_0$ firmware (108) and $L_1$ software (110) reside on the "head" vehicle of a platoon. In contrast, $L_2$ code (112) and higher layer code (114, 116, 118) reside on other vehicles. How autonomous vehicle (102a) becomes head is described in more detail below but, in one embodiment, could be statically assigned at the beginning of a route (e.g., if a "fleet" of autonomous vehicles are leaving from a secure location). The $L_1$ software (110) may include a flash image of platooning code that handles the transmission of platooning data to one or more other autonomous vehicles (102b-102n). In one embodiment, this data includes data such as the head vehicle's speed, road conditions, braking info, and any other information relevant to the platoon.

In one embodiment, the head autonomous vehicle (102a) transmits messages via a VANET or another network as described above. Alternatively, or in conjunction with the foregoing, the head autonomous vehicle (102a) transmits messages via broadcasting the message to a blockchain. In some embodiments, the blockchain comprises a public, private, or consortium blockchain. The blockchain may be built based on the Ethereum block chain or any other suitable blockchain technology. When used in conjunction with a VANET, the autonomous vehicles ($102a$-$102n$) may simultaneously transmit the messages via the VANET and post the messages to the blockchain as well (for logging purposes).

Regardless of the transmission, in the illustrated embodiment, each message is digitally signed using the senders private key generated as described above. Additionally, in some embodiments, the message itself is encrypted using the public key of the recipient. In one embodiment, every autonomous vehicle ($102a$-$102n$) broadcasts a message with their public keys and certificates to the blockchain, allowing each vehicle access to any vehicles public key. Since the blockchain is validated by each peer, the inherent security in the blockchain paradigm ensures that the public keys, certificates, and identifiers are valid. Alternatively, a trusted central store may be utilized to record known public keys, vehicle identifies, and certificates.

In the illustrated embodiment, the platoon of autonomous vehicles ($102a$-$102n$) transmits messages sequentially. That is, head autonomous vehicle ($102a$) transmits operational instructions to second autonomous vehicle ($102b$) which in turn transmits instructions to third autonomous vehicle ($102c$) and so forth. However, as will be discussed below, there is no limitation on how messages are passed (specifically when a platoon change occurs). FIG. 1 illustrates how the DICE-RIoT protocol is used to secure messages exchanged among autonomous vehicles ($102a$-$102n$). At each layer (e.g., autonomous vehicle) (110, 112, 114, 116, 118), the messages passed are digitally signed using the keys generated by the autonomous vehicles ($102a$-$102n$). Specifically, at each layer a one-way function is used to generate the values $K_{L1}$, . . . $K_{Ln}$. Specifically, the value of $K_{L1}$ is calculated using the formula $K_{L1}$=KDF (DS, Hash ($L_1$)), where DS is the device secret (108) and Hash($L_1$) is a cryptographic hash of the code operating at Layer 1. The function KDF may comprise a one-way hash function such as an HMAC function. As the message progresses among the layers, each key is calculated using a similar formula $K_{Ln}$=KDF ($K_{Ln-1}$, Hash ($L_n$)). Thus, the derived key $K_{L1}$ depends on both the Device Secret and the cryptographic identity of $L_1$. Since the Device Secret uniquely identifies the device hardware, the program $L_1$ can use $K_1$ in a proof-of-possession protocol to prove to the manufacturer both the identity of the platform and the cryptographic identity of the code that it is running. In other words, $K_1$ can be used for both device and software attestation. A layer's derived keys can also be used to secure private data. $L_1$ can use $K_1$ to encrypt and integrity protect data that is stored locally—a security primitive that is referred to as sealing. The KDF-based key derivation scheme provides excellent protection against malware attempting to obtain decryption keys and decrypt the data. For instance, if an attacker could replace $L_1$ to receive or extract $K_1$, the attacker would obtain a different key and would not be able to decrypt previously stored data. This is because the derived key is based on the identity of the component receiving the key.

In one embodiment, the Hash($L_n$) value comprises a firmware ID (FWID) of the Layer n software. Alternatively, or in conjunction with the foregoing, the Hash($L_n$) value comprises a hardware identifier and/or vehicle identification number and/or any other identifier associated with the vehicle. In some embodiments, each autonomous vehicles FWID may be recorded in the blockchain which allows for authentication by other autonomous vehicles. As described above, a layer provides the next layer with a key based on a hash of the layer's code. Thus, the layer generating the key must retrieve the hash from either the vehicle or a secure storage mechanism (e.g., blockchain). By utilizing a distributed storage mechanism such as blockchain, the various layers of a DICE-RIoT architecture (which normally execute on the same device) may be distributed.

Consider the derivation of $K_{L2}$ performed by Layer 1. The code executing in Layer 1 would perform the operation of $K_{L2}$=KDF ($K_{L1}$, Hash ($L_2$)). In one embodiment, Hash ($L_2$) comprises an FWID of $L_2$ (software on an external vehicle) that is broadcast on a blockchain and retrieved by the code of Layer 1. Since the blockchain storage was authenticated previously, Layer 1 can be sure that this FWID is accurate and thus can generate the next key KL2 using the FWID and its own key. In one embodiment, the FWID is generated using the standard DICE-RIoT mechanism (i.e., a Firmware Security Descriptor), the details of which are not included herein.

Figure 2B:
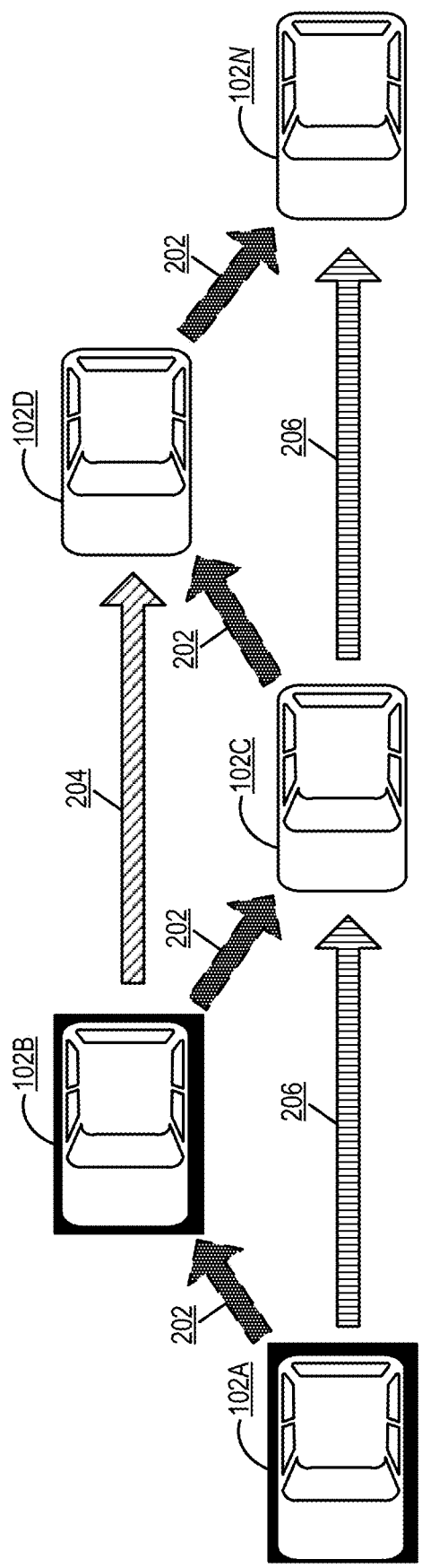
Figure 2C:
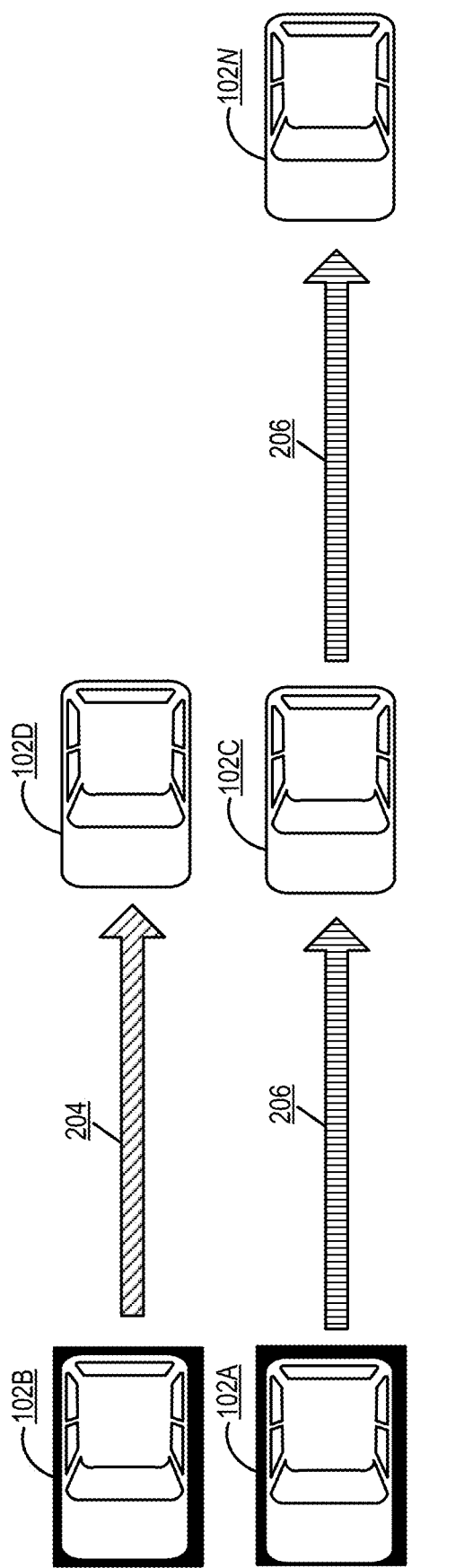

FIGS. 2A through 2C illustrate an autonomous vehicle platoon change according to some embodiments of the disclosure.

In FIG. 2A, a first path (200) exists between autonomous vehicles ($102a$-$102n$). As described above, this path (200) represents an ordered flow of communication of platooning data (e.g., speed, direction, etc.). In the illustrated embodiment, commands are issued by head autonomous vehicle ($102a$) and pass along the path (200) until reaching the last vehicle ($102n$).

In FIG. 2B, autonomous vehicle ($102b$) issues a request to become the head autonomous vehicle of a second platoon. For example, autonomous vehicles ($102b$, $102d$) may be changing routes at an intersection and thus will deviate from the platoon represented by autonomous vehicles ($102a$, $102c$, $102n$). While autonomous vehicles ($102b$, $102d$) are illustrated as no longer in platoon formation, this is merely to illustrate the logical distinction between the platoons.

In this transitional phase, two new paths (204, 206) are formed representing the new platoons. These new paths (204, 206) are maintained along with the original path (202). During this phase, head vehicle ($102a$) may continue to control the operation of all vehicles ($102b$-$102n$) until the handoff to second head vehicle ($102b$) is complete.

In FIG. 2C, the transition to two platoons is completed. Now, the original path (202) has been destroyed and the new paths (204, 206) are confirmed. In this state, head autonomous vehicles ($102a$, $102b$) control their respective platoons as in FIG. 2A.

Figure 3A:
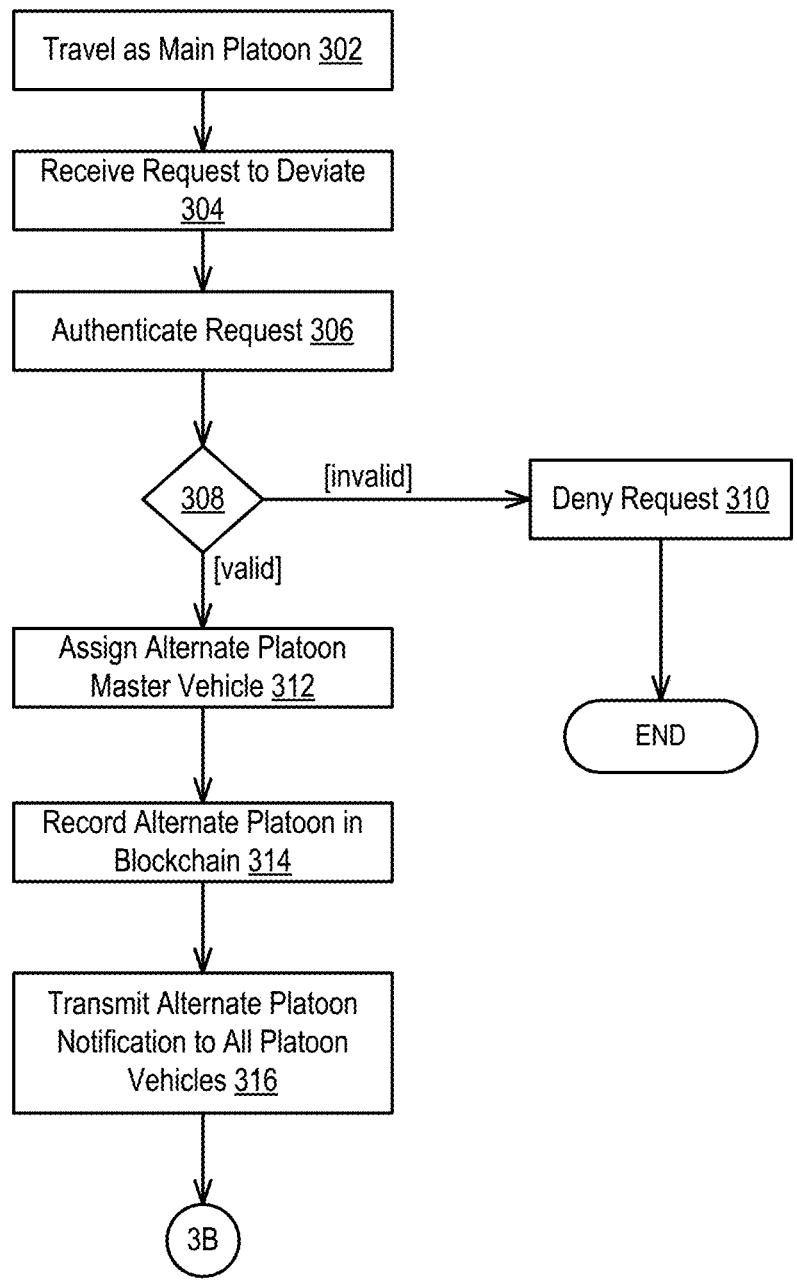
FIG. 3A is a flow diagram illustrating a method for processing a platoon change request message according to some embodiments of the disclosure.

FIG. 3A is a flow diagram illustrating a method for processing a platoon change request message according to some embodiments of the disclosure.

In step 302, the method operates a platoon of autonomous vehicles.

In one embodiment, a platoon comprises a head or master autonomous vehicle and one or more other autonomous vehicles. These autonomous vehicles are arranged in chain or path of autonomous vehicles. The head autonomous vehicle is responsible for managing and planning the route. It transmits control messages to the second autonomous vehicle in the path of autonomous vehicles. These control messages provide, for example, the speed of the head autonomous vehicle, routing information for the head autonomous vehicle, and any other pertinent information.

In step 304, the method receives a request to deviate from the platoon from one or more of the autonomous vehicles.

In one embodiment, this request is received by the head autonomous vehicle although in other embodiments it may be initially received from a centralized system. In one embodiment, the request received in step 304 is a digitally signed request, wherein the request is signed by the private key of the autonomous vehicle allegedly issuing the request. As described above, this private key may be generated using a DICE-RIoT architecture and thus can be guaranteed as secure.

In step 306, the method authenticates the request.

In one embodiment, step 306 is performed by a current head autonomous vehicle of a platoon. In one embodiment, the head autonomous vehicle maintains a block chain storing all details regarding the autonomous vehicles in the platoon. These details may include, for example, the public keys and certificates of all autonomous vehicles in the platoon. In step 306, the head autonomous vehicle receives a request to deviate that is signed using the private key of one of the platoon autonomous vehicles. The request may additionally include a vehicle identifier (ID) or another identifier. The head autonomous vehicle retrieves the public key associated with the vehicle ID and attempts to verify the signature, thus verifying that the request, indeed, came from the autonomous vehicle purporting to make the request. In some embodiments, the request may further include a list of autonomous vehicles that will follow the autonomous vehicle making the request. In other embodiments, the current head vehicle may broadcast a notification that a change is to be made and request that any autonomous vehicles joining the new platoon identify themselves. The head autonomous vehicle may then verify the new platoon autonomous vehicles by performing a similar verification using digital signatures of the autonomous vehicles.

If the head autonomous vehicle cannot validate the request (i.e., the digital signature is fraudulent), the method denies the request (step 310). In some embodiments, the method may further log the unauthorized request and any details (e.g., Internet Protocol (IP) address) associated with the request. In one embodiment, these details are logged to a blockchain data structure to ensure that the data is not tampered with.

If the head autonomous vehicle determines that the request is valid (i.e., the digital signature is valid), the method proceeds to assign the requesting autonomous vehicle as a new master vehicle in step 312. At this stage, the original platoon is still intact and the second master autonomous vehicle is not able to control the new platoon autonomous vehicles.

In step 314, the head autonomous vehicle records the change of platoon in a blockchain data structure. FIG. 4 is a diagram of an autonomous vehicle blockchain and block layout according to some embodiments of the disclosure.

In the blockchain illustrated in FIG. 4, a plurality of blocks (401-405) are illustrated, as well as a genesis block (400). As is known in the art, a blockchain represents an immutable and cryptographically verified record of transactions or changes in state of data. In the instant application, each time a change in platooning is made, the change is recorded to the blockchain. In one embodiment, only selected autonomous vehicles access the blockchain. For example, only current head autonomous vehicles may participate in the consensus algorithm employed by the blockchain. In this manner, all changes to platoon data are verified and recorded for future retrieval if needed. Additionally, the inherent verification of a blockchain ensures that rogue entities cannot maliciously attempt to issue platoon changes. This is ensured due to the use of DICE-RIoT keys as blockchain addresses, since the DICE-RIoT keys cannot be compromised or tampered with.

FIG. 4 additionally illustrates the contents of a block (403) in the chain. As illustrated, each block includes a main ledger block header (403A) that includes a hash of the current block and hash of the previous block. As used herein, this header (403A) corresponds to a master blockchain stored by an organization that manages multiple platoons. In this context, the master ledger refers to the ledger storing all platoon changes. In contrast, the ledger of master autonomous vehicle block header (403B) stores a local blockchain for a given platoon. As describe above, in one embodiment, a given head autonomous vehicle manages a platoon and the associated blockchain. Thus, the head autonomous vehicle generates its own block header when adding platoon changes to the local blockchain. As illustrated, the master block header (403B) includes the vehicle identification number (VIN) of the master autonomous vehicle, current and previous block hashes, and a block signature (signed using the master autonomous vehicle private key).

In the body of block (403), a triple comprising the vehicle identifier (403C), certificate (403D), and public key (403E) is stored. This triple represents a destination autonomous vehicle of the message or transaction stored within the block. The block additionally includes a timestamp (403F) associated with the timing of the message included in the block.

Additionally, included in the block is service information (403G) representing the contents of the message sent to the vehicle identified by triple (403C-403E). In the illustrated embodiment, the service information includes a current path the vehicle is on. The service information may also include a disconnection point such as a specific geographic coordinate that the vehicle should disconnect from the platoon. The service information may also include the current active master of the platoon (i.e., the head autonomous vehicle as represented by vehicle identifier, certificate, or public key). The service information may also include an identifier (i.e., triple) of the next head or master autonomous vehicle after disconnecting from the main platoon.

Finally, each block is signed by the sender (e.g., the head autonomous vehicle) and the signature is packed and included in the block as packed digital signature (403H). In the illustrated embodiment, the signature (403H) is signed using the senders private key and is verified by a receiver using the receivers public key.

Returning to FIG. 3A, as part of recording the alternate platoon information, the blockchain is inherently transmitted to all platoon members.

Thus, in step 316, the method transmits the alternate platoon notification to all platoon vehicles being managed by a head autonomous vehicle. In one embodiment, this notification may include the service information discussed above. In some embodiments, the autonomous vehicles may receive this information via DSRC or 5GLTE networks. However, the autonomous vehicles may alternatively receive the information via blocks added to the blockchain. However, if the blockchain is used to distribute the service information, the method may use a quicker consensus algorithm as compared to traditional proof of work (PoW) means. For example, the method may use proof of event with dynamic federation consensus to rapidly confirm new blocks. The use of DICE-RIoT ensuring authenticity of message may also be used to bypass stricter security checks during consensus.

Figure 3B:
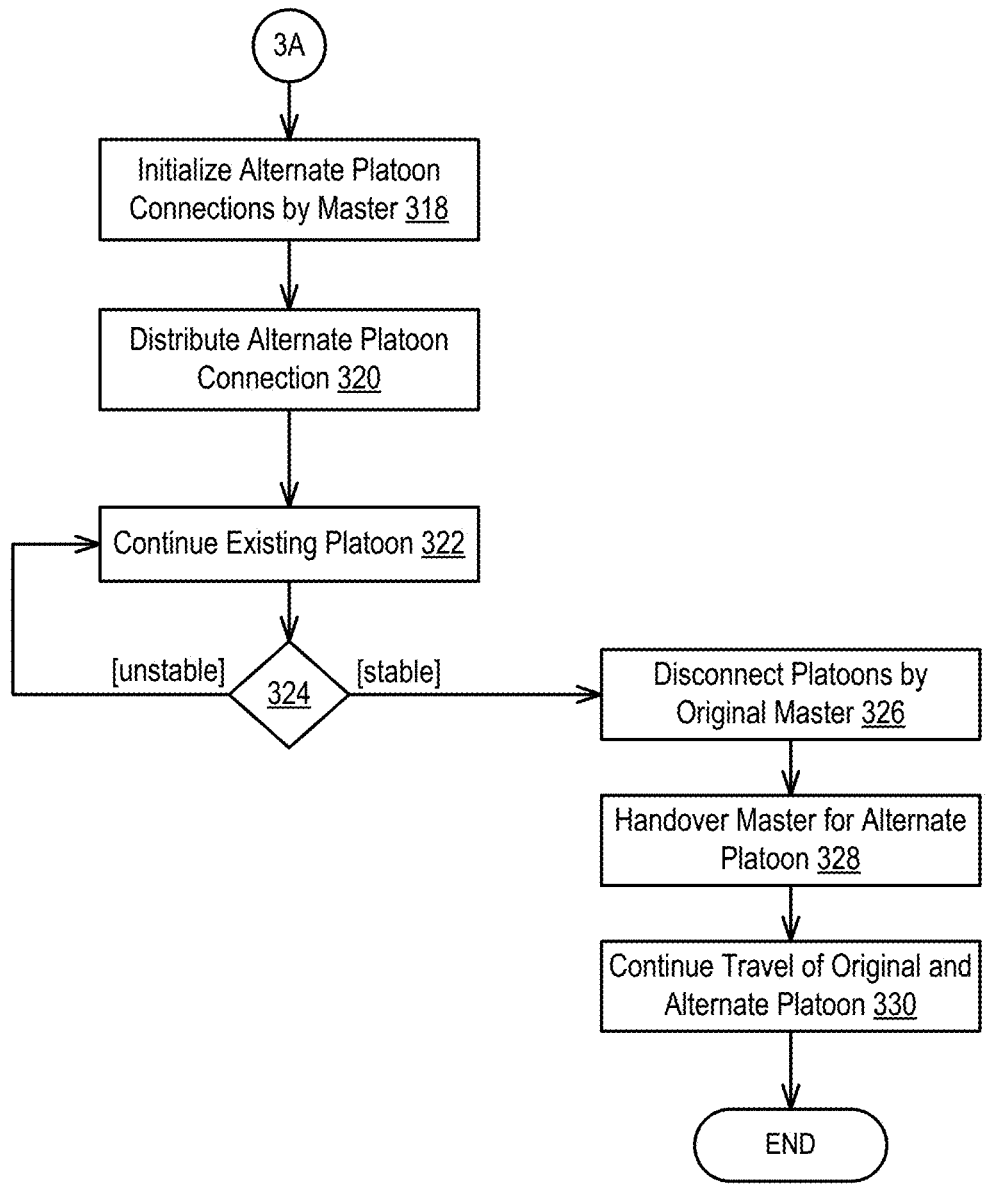
FIG. 3B is a flow diagram illustrating a method for changing a platoon according to some embodiments of the disclosure.

FIG. 3B is a flow diagram illustrating a method for changing a platoon according to some embodiments of the disclosure.

In step 318, the method initializes alternate platoon connections. In one embodiment, this is performed by the current platoon head autonomous vehicle. In one embodiment, alternate platoon connections comprise a listing of autonomous vehicles in the new platoon and an identifier of a new master autonomous vehicle.

In step 320, the method distributes the alternate platoon connection to all other vehicles in the platoon. Notably, this step distributes the alternate platoon plan to all other vehicles, not just the vehicles involved in the new platoon. In this manner, each autonomous vehicle has a record of the platoon change. In some embodiments, each vehicle may be involved in confirming the validity of the platoon change via a blockchain consensus algorithm.

In step 322, the method continues the existing platoon. In this step, all vehicles maintain the platoon formation. In one embodiment, the existing head autonomous vehicle may continue to broadcast platoon control commands while the handover is taking place.

In step 324, the method determines if the platoon change is stable. In one embodiment, determining if the platoon change is stable comprises ensuring that the platoon change has been validated by the peers on the blockchain. In some embodiments, the method only requires single block verification. In other embodiments, the method may require double or multiple block verification before executing a platoon change. In this manner, the method ensures that rogue blocks are not added to the chain and an invalid platoon change is made. As illustrated, the method continues the existing platoon until the new platoon is stabilized.

Once the new platoon has been verified and recorded in the blockchain, the method disconnects the new platoon from the original platoon (step 326). In one embodiment, this may be performed by the original master autonomous vehicle or may be performed by the new master. In one embodiment, the disconnection is pre-established as part of the service information. For example, the service information may be included within a block and this service information includes a specific point in which the new platoon should disconnect from the main platoon.

In step 328, the method hands over master authority to the new platoon leader.

In one embodiment, as part of the hand over, the new master assumes the role of managing the local blockchain for the new platoon. Thus, the new platoon leader autonomous vehicle may perform all the previous operations using a newly established blockchain.

In step 330, the new and original platoons continue traveling according to the route information associated with each platoon (as previously discussed).

Figure 5:
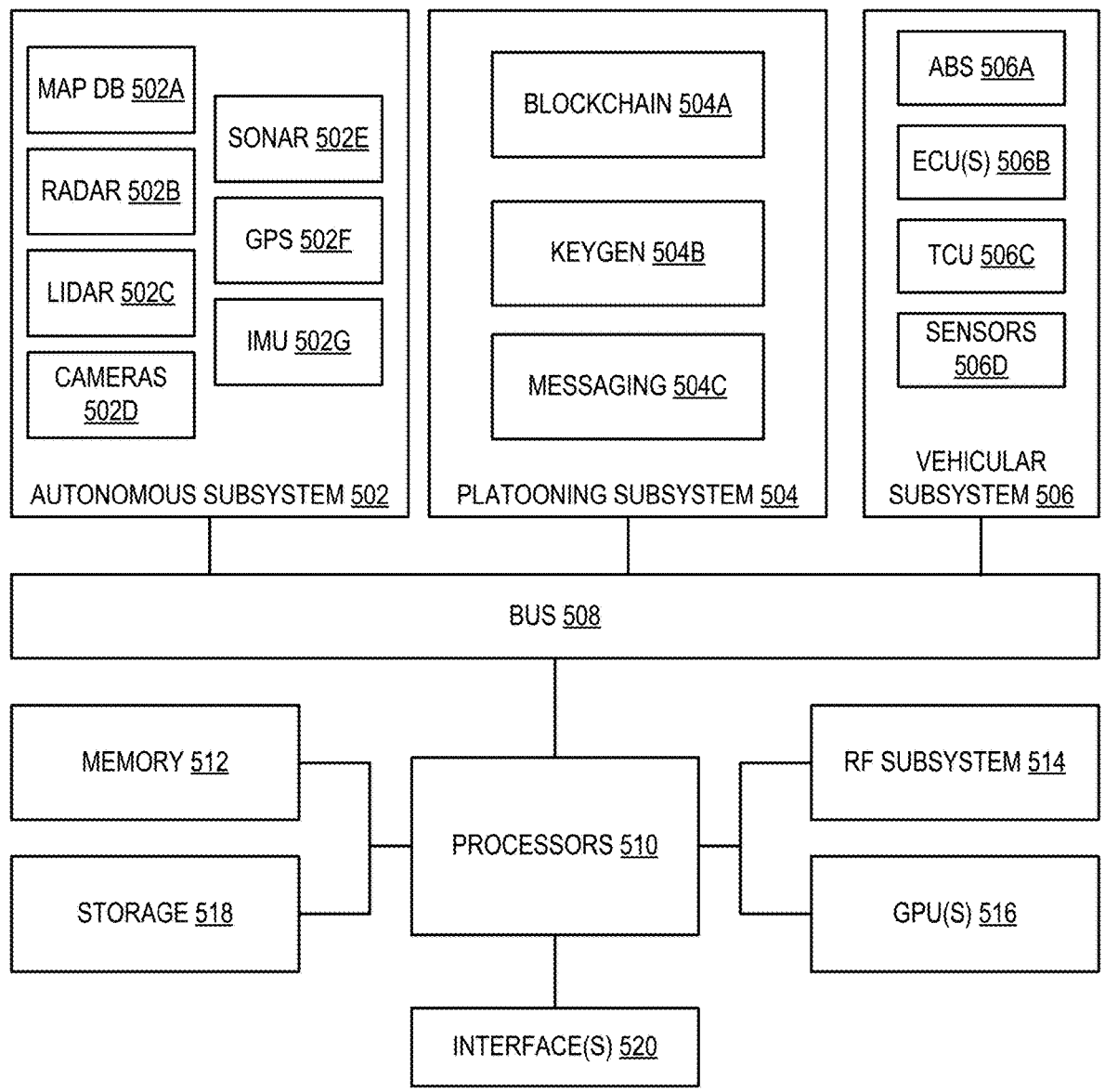
FIG. 5 is a block diagram of an autonomous vehicle according to some embodiments of the disclosure.

FIG. 5 is a block diagram of an autonomous vehicle according to some embodiments of the disclosure.

The system illustrated in FIG. 4 may be installed entirely within a vehicle. In some embodiments, some components (e.g., components and subsystems other than subsystem (504)) may comprise existing autonomous vehicle subsystems.

The system includes an autonomous vehicle subsystem (502). In the illustrated embodiment, autonomous vehicle subsystem (502) includes map database (502A), radar devices (502B), Lidar devices (502C), digital cameras (502D), sonar devices (502E), GPS receivers (502F), and inertial measurement units (502G). Each of the components of autonomous vehicle subsystem (502) comprise standard components provided in most current autonomous vehicles. In one embodiment, map database (502A) stores a plurality of high-definition three-dimensional maps used for routing and navigation. Radar devices (502B), Lidar devices (502C), digital cameras (502D), sonar devices (502E), GPS receivers (502F), and inertial measurement units (502G) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem (506) is additionally included within the system. Vehicular subsystem (506) includes various anti-lock braking systems (506A), engine control units (502B), and transmission control units (502C). These components may be utilized to control the operation of the autonomous vehicle in response to the streaming data generated by autonomous vehicle subsystem (502A). The standard autonomous vehicle interactions between autonomous vehicle subsystem (502) and vehicular subsystem (506) are generally known in the art and are not described in detail herein.

The processing side of the system includes one or more processors (510), short-term memory (512), an RF system (514), graphics processing units (GPUs) (516), long-term storage (518) and one or more interfaces (520).

The one or more processors (510) may comprise central processing units, FPGAs, or any range of processing devices needed to support the operations of the autonomous vehicle. Memory (512) comprises DRAM or other suitable volatile RAM for temporary storage of data required by processors (510). RF system (514) may comprise a cellular transceiver and/or satellite transceiver. Long-term storage (518) may comprise one or more high-capacity solid-state drives (SSDs). In general, long-term storage (518) may be utilized to store, for example, high-definition maps, routing data, and any other data requiring permanent or semi-permanent storage. GPUs (516) may comprise one more high throughput GPU devices for processing data received from autonomous vehicle subsystem (502A). Finally, interfaces (520) may comprise various display units positioned within the autonomous vehicle (e.g., an in-dash screen).

The system additionally includes a platooning subsystem (504) which performs all the platooning operations required by the methods illustrated in the preceding Figures. The platooning subsystem (504) includes a blockchain storage device (504) which is connected to bus (508) and processes and stores blockchain data transmitted on the bus (508).

The platooning subsystem (504) additionally includes a key generator (504B). In one embodiment, key generator (504B) is configured with ROM-based components and software-based components to generate keys (including keys for multiple levels of a DICE-RIoT-based system).

The platooning subsystem (504) additionally includes a message processor (504C). In one embodiment, the message processor (504C) is configured to broadcast, singlecast, or multicast messages to one or more autonomous vehicles.

Each of the devices is connected via a bus (508). In one embodiment, the bus (508) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   establishing a network connection between a plurality of autonomous vehicles, the plurality of autonomous vehicles operating as a platoon;
   receiving a request from a first autonomous vehicle to deviate from the platoon, the request comprising a digitally signed message from the first autonomous vehicle;
   assigning the first autonomous vehicle as a second master autonomous vehicle;
   permanently recording the assignment in a blockchain data structure;
   instantiating a new platoon path using the first autonomous vehicle as a head of the new platoon path, the new platoon path comprising an ordered subset of the plurality of autonomous vehicles wherein a first autonomous vehicle in the ordered subset comprises the first autonomous vehicle and a remaining portion of the ordered subset comprises a second set of autonomous vehicles selected based on future routes of the second set of autonomous vehicles; and
   disconnecting the ordered subset of the plurality of autonomous vehicles from the platoon upon determining that the new platoon path is stable, the disconnecting causing the second master autonomous vehicle to manage the ordered subset of the plurality of autonomous vehicles using a second blockchain data structure stored on the second master autonomous vehicle, the second blockchain data structure accessible only by the ordered subset of the plurality of autonomous vehicles in the new platoon path.

2. The method of claim 1, the establishing the network connection comprising establishing a vehicle ad-hoc network (VANET) between the plurality of autonomous vehicles.

3. The method of claim 1, wherein the request is secured using a DICE-RIoT protocol.

4. The method of claim 3, further comprising authenticating the request using a public key of the first autonomous vehicle.

5. The method of claim 4, further comprising denying the request if the authenticating is not successful.

6. The method of claim 1, the permanently recording the assignment in the blockchain data structure comprising achieving a consensus to record the assignment in the blockchain data structure among a plurality of head autonomous vehicles, each of the head autonomous vehicles managing respective platoons of autonomous vehicles.

7. The method of claim 1, the permanently recording the assignment in the blockchain data structure comprising recording a block to the blockchain data structure, the block comprising an identifier, certificate, and a public key identifying a recipient autonomous vehicle, a timestamp, and service information related to the assignment.

8. A non-transitory computer readable storage medium for tangibly storing computer program instructions capable of being executed by a computer processor, the computer program instructions defining steps of:
   establishing a network connection between a plurality of autonomous vehicles, the plurality of autonomous vehicles operating as a platoon;
   receiving a request from a first autonomous vehicle to deviate from the platoon, the request comprising a digitally signed message from the first autonomous vehicle;
   assigning the first autonomous vehicle as a second master autonomous vehicle;
   permanently recording the assignment in a blockchain data structure;
   instantiating a new platoon path using the first autonomous vehicle as a head of the new platoon path, the new platoon path comprising an ordered subset of the plurality of autonomous vehicles wherein a first autonomous vehicle in the ordered subset comprises the first autonomous vehicle and a remaining portion of the ordered subset comprises a second set of autonomous vehicles selected based on future routes of the second set of autonomous vehicles; and
   disconnecting the ordered subset of the plurality of autonomous vehicles from the platoon upon determining that the new platoon path is stable, the disconnecting causing the second master autonomous vehicle to manage the ordered subset of the plurality of autonomous vehicles using a second blockchain data structure stored on the second master autonomous vehicle, the second blockchain data structure accessible only by the ordered subset of the plurality of autonomous vehicles in the new platoon path.

9. The non-transitory computer readable storage medium of claim 8, the establishing the network connection comprising establishing a vehicle ad-hoc network (VANET) between the plurality of autonomous vehicles.

10. The non-transitory computer readable storage medium of claim 8, wherein the request is secured using a DICE-RIoT protocol.

11. The non-transitory computer readable storage medium of claim 10, wherein the computer program instructions further define a step of authenticating the request using a public key of the first autonomous vehicle.

12. The non-transitory computer readable storage medium of claim 11, the computer program instructions further defining a step of denying the request if the authenticating is not successful.

13. The non-transitory computer readable storage medium of claim 8, the permanently recording the assignment in the blockchain data structure comprising achieving a consensus to record the assignment in the blockchain data structure among a plurality of head autonomous vehicles, each of the head autonomous vehicles managing respective platoons of autonomous vehicles.

14. The non-transitory computer readable storage medium of claim 8, the permanently recording the assignment in the blockchain data structure comprising recording a block to the blockchain data structure, the block comprising an identifier, certificate, and a public key identifying a recipient autonomous vehicle, a timestamp, and service information related to the assignment.

15. A device comprising:
   a processor; and a storage medium for tangibly storing thereon program logic for execution by the processor, the stored program logic comprising:

logic, executed by the processor, for establishing a network connection between a plurality of autonomous vehicles, the plurality of autonomous vehicles operating as a platoon;

logic, executed by the processor, for receiving a request from a first autonomous vehicle to deviate from the platoon, the request comprising a digitally signed message from the first autonomous vehicle;

logic, executed by the processor, for assigning the first autonomous vehicle as a second master autonomous vehicle;

logic, executed by the processor, for permanently recording the assignment in a blockchain data structure;

logic, executed by the processor, for instantiating a new platoon path using the first autonomous vehicle as a head of the new platoon path, the new platoon path comprising an ordered subset of the plurality of autonomous vehicles wherein a first autonomous vehicle in the ordered subset comprises the first autonomous vehicle and a remaining portion of the ordered subset comprises a second set of autonomous vehicles selected based on future routes of the second set of autonomous vehicles; and logic, executed by the processor, for disconnecting the ordered subset of the plurality of autonomous vehicles from the platoon upon determining that the new platoon path is stable, the disconnecting causing the second master autonomous vehicle to manage the ordered subset of the plurality of autonomous vehicles using a second blockchain data structure stored on the second master autonomous vehicle, the second blockchain data structure accessible only by the ordered subset of the plurality of autonomous vehicles in the new platoon path.

16. The device of claim 15, wherein the logic for establishing the network connection comprises establishing logic, executed by the processor, for a vehicle ad-hoc network (VANET) between the plurality of autonomous vehicles.

17. The device of claim 15, wherein the request is secured using a DICE-RIoT protocol.

18. The device of claim 17, wherein the logic for receiving the request to deviate from the platoon comprises logic, executed by the processor, for authenticating the request using a public key of the first autonomous vehicle.

19. The device of claim 15, wherein the logic for permanently recording the assignment in the blockchain data structure comprises logic, executed by the processor, for achieving a consensus to record the assignment in the blockchain data structure among a plurality of head autonomous vehicles, each of the head autonomous vehicles managing respective platoons of autonomous vehicles.

20. The device of claim 15, wherein the logic for permanently recording the assignment in the blockchain data structure comprises logic, executed by the processor, for recording a block to the blockchain data structure, the block comprising an identifier, certificate, and a public key identifying a recipient autonomous vehicle, a timestamp, and service information related to the assignment.

* * * * *